United States Patent [19]

Bayer et al.

[11] Patent Number: 5,262,131
[45] Date of Patent: Nov. 16, 1993

[54] CATALYTIC REGENERATIVE THERMAL OXIDIZER

[75] Inventors: Craig E. Bayer; Edward G. Blazejewski; Carlton L. Bledsoe, all of Wellsville, N.Y.

[73] Assignee: ABB Air Preheater, Inc., Wellsville, N.Y.

[21] Appl. No.: 879,934

[22] Filed: May 8, 1992

[51] Int. Cl.⁵ ............................................. F01N 3/10
[52] U.S. Cl. ................................. 422/175; 422/177; 422/171; 423/245.3
[58] Field of Search ................... 422/175, 177, 171; 423/245.3, 245.1; 588/215, 216

[56] References Cited

U.S. PATENT DOCUMENTS

| | | | |
|---|---|---|---|
| 3,632,304 | 1/1972 | Hardison | 423/245.3 |
| 3,853,482 | 12/1974 | Bhan | 422/109 |
| 3,972,682 | 8/1976 | Stephens et al. | 422/78 |
| 4,168,228 | 9/1979 | Mallatt et al. | 210/626 |
| 4,650,414 | 3/1987 | Grenfell | 422/173 |
| 4,701,312 | 10/1987 | Kice | 422/177 |
| 4,983,364 | 1/1991 | Buck et al. | 422/171 |
| 4,985,211 | 1/1991 | Akiyama et al. | 422/177 |

Primary Examiner—Robert J. Warden
Assistant Examiner—Hien Tran
Attorney, Agent, or Firm—Chilton, Alix & Van Kirk

[57] ABSTRACT

A catalytic regenerative oxidizer (18) comprises a closed casing (24) having upper and lower ends, an input port (20) at the lower end and an output port (22) at the upper end. The casing contains a plurality of stacked layers or beds, including upper (34), lower (32), and central beds (40) of silica gravel or the like. Two catalyst layers (36, 38) are provided in the stack, one between the lower and central gravel beds, and the other between the upper and central gravel beds. A heating element (42) is situated in the central bed, for maintaining at least one of the catalyst layers at an activation temperature in the range of about 500–1000 deg.F. The catalyst layers are formed by a multiplicity of ceramic pellets on which is deposited a catalyst material, such as precious metal. The contaminated gas stream enters the casing through the lower port and passes vertically through the stacked beds and layers. Oxidation of the organic compounds occurs in the catalyst layers, such that clean air is discharged through the outlet port.

12 Claims, 1 Drawing Sheet

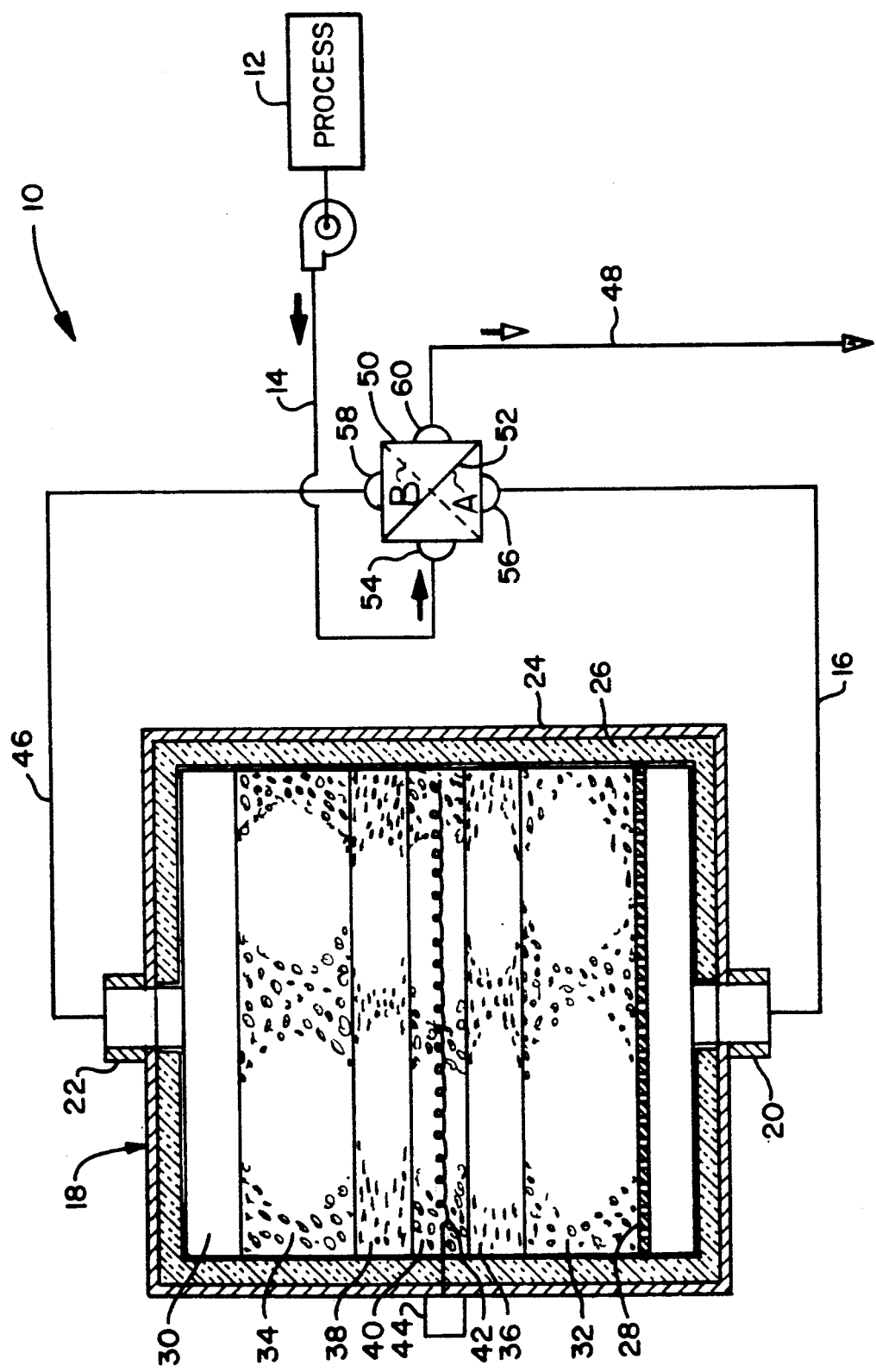

CATALYTIC REGENERATIVE THERMAL OXIDIZER

BACKGROUND OF THE INVENTION

The present invention relates to apparatus for destroying volatile organic compounds in an air stream.

Conventional apparatus for removing volatile organic compounds from an air stream, generally are of two types. The first is based on thermal regenerative oxidation, which provides high heat recovery (95%-98%), but requires high oxidation temperatures (1400-1900 deg.F). The second type relies on catalytic recuperative oxidation, which has lower heat recovery (80% maximum), but requires lower oxidation temperatures (500-700 deg.F).

Thus, if one selects a thermal regenerative oxidation system, the high energy cost associated with maintaining high oxidation temperatures can more or less be tolerated because of the high heat recovery, i.e., efficiency. Direct energy costs can be reduced with respect to operating at lower oxidation temperatures with a conventional catalyst system, but with the added costs associated with the use of a catalyst and the lower thermal efficiency.

SUMMARY OF THE INVENTION

It is an object of the present invention to provide an oxidizer system to destroy volatile organic compounds in an air stream, which operates at relatively low oxidation temperatures, while providing relatively high heat recovery.

According to the invention, a thermal oxidizer is provided for destroying volatile organic compounds in an air stream, the oxidizer including a bed of regenerative heat transfer material and means for heating the bed to oxidize the compounds as the air flows through the bed, wherein the improvement is characterized by the bed including an oxidation catalyst carried by solid surfaces distributed in the air flow in the bed, and the means for heating maintaining the catalyst at a temperature in the range of about 500-1000 deg.F.

In a particular embodiment of the invention, a catalytic regenerative oxidizer comprises a closed casing having upper and lower ends, an input port at the lower end and an output port at the upper end. The casing contains a plurality of stacked layers or beds, including upper, lower, and central beds of silica gravel or the like. Two catalyst layers are provided in the stack, one between the lower and central gravel beds, and the other between the upper and central gravel beds. A heating element is situated in the central bed, for maintaining at least one of the catalyst layers at an activation temperature in the range of about 500-1000 deg.F. The catalyst layers are formed by a multiplicity of ceramic pellets on which is deposited a catalyst material, such as precious metal. The contaminated gas stream enters the casing through the lower port and passes vertically through the stacked beds and layers. Oxidation of the organic compounds occurs in the catalyst layers, such that clean air is discharged through the outlet port.

A significant advantage of the present invention is that, by placing the catalyst in the bed, it serves not only as a catalyst but also as a heat transfer material. More generally, the lower bed (adjacent the inlet port) preheats the incoming air such that when the air contacts the catalyst layers, it is at the appropriate activation temperature. Because the catalyst is carried on ceramic pellets, the heat energy in the pellets is available to help the catalytic reaction. Moreover, the pellets also help trap heat within the casing.

Another advantage is that, with the catalyst stacked along with the normal silica gravel heat transfer material, the catalyst does not require a support frame, as is commonly provided with conventional catalytic oxidizers. This feature of the invention also eliminates leakage losses which occur around the catalyst frame in conventional oxidizers.

By using the catalyst layer as a supplement to the regenerative heat transfer material, the present invention can provide high heat recovery (95%-98%), with a low operating temperature (500-1000 deg.F., preferably 500-700 deg.F). This lowers the operating costs by a factor of eight over conventional regenerative thermal designs, and by a factor of four over conventional recouperative catalytic designs.

BRIEF DESCRIPTION OF THE DRAWING

These and other objects and advantages of the invention are further set forth in the following description made with reference to the accompany FIGURE, which shows an air stream processing system in accordance with the invention.

DESCRIPTION OF THE PREFERRED EMBODIMENT

The FIGURE shows a catalytic regenerative oxidizer system 10 situated down stream from an industrial process generally represented by schematic block 12. A by-product of the process 12 may include a volatile organic compound, such as ethanol.

An air or gas stream including volatile ethanol is forced from the process 12 through line 14, which may include a pump or fan, and delivered, via inlet line 16, to the catalytic regenerative oxidizer 18. The oxidizer 18 has an inlet port 20 and an exit port 22 at the lower and upper ends of an otherwise closed and sealed steel casing 24. The casing is preferably lined with insulating material such as ceramic 26 to minimize heat loss through the casing walls.

At the lower end of the casing, a perforated steel plate or the like 28 defining a distribution manifold receives the inlet gas stream through port 20 and distributes the gas substantially uniformly along the horizontally oriented lower surface of the reaction beds, to be described below. A collecting manifold 30 is provided at the upper end of the casing, but need not have structural support or baffles, although these may optionally be provided to direct the flow toward outlet port 22.

The active region within the casing 24 preferably contains stacked beds, or layers, of material by which the volatiles in the air stream are oxidized as the air stream flows upwardly through the beds. The lower bed 32 can be any conventional gravel type material that is suitable for pre-heating the air stream that enters bed 32 from the perforated steel plate 28. Such bed would typically be made of silica gravel, with the bed thickness in a direction of air flow, of about 6-12 inches.

A first, or lower, catalyst layer 36 rests on the lower bed 32, preferably formed as a region of ceramic pellets each having a diameter in the range of about 5-10 mm. The overall layer thickness is preferably at least 3 inches, in particular 3-6 inches, depending on specific process requirements. The ceramic pellets provide solid surfaces which act as substrates for the catalyst material, preferably a precious metal. In the given example in which the air stream contains ethanol, the catalyst could be platinum-based, and become effective at an activation temperature of about 500 deg.F. Information concerning the particular types of catalysts that are effective to oxidize particular organic compounds at particular temperatures, is commonly available from handbooks and vendors in the relevant technical field.

Table 1 provides representative examples.

TABLE 1

| Selected Catalysts and Associated Activation Temperatures | | |
|---|---|---|
| Organic Compound | Catalyst | Approx. Activ. Temperature |
| Ethanol | Platinum, Palladium | 500° F. |
| Hexane | Platinum, Palladium | 700° F. |
| Butane | Platinum, Palladium | 1000° F. |

A second, or central, gravel bed 40 rests on the first catalyst layer 36, and preferably has a thickness of approximately 4 inches, i.e., within about plus or minus 50% of the thickness of the catalyst layer 36. A second catalyst layer 38 similar to the first 36, rests on the central gravel bed 40. Finally, an upper gravel bed 34 similar to the lower bed 32, rests on the second catalyst layer 38.

An electric heating coils 42 or similar heating means are situated in the central gravel layer 40 between the catalyst layers 36, 38 for introducing heat at substantially the center of the casing 24. The coils have associated sensors and control system 44 to maintain at least one of the catalyst layers 36, 38 at the desired catalyst activation temperature, i.e., in the range of 500-1000 deg.F.

It can be appreciated that the oxidizer 18 as shown, is substantially symmetric above and below the heating coils 42. This arrangement is conducive to the periodic reversal of air flow direction through the reactor 18. This can be achieved, for example, by a valve box 50 or the like, having an adjustable baffle or vane structure 52. In the operating mode described immediately above, the air stream in line 14 enters the valve box through port 54, is directed by the baffle 52 in position A, and exits the valve box through port 56 into line 16, whereupon it enters the oxidizer lower end through inlet port 20. The clean air exits the outlet port 22 and is delivered through outlet line 46 into the valve box 50 through port 58 and directed by the baffle 52 in position A toward port 60, as a stack exhaust flow 48.

Alternatively, baffle 52 can be rearranged into position B, such that the source air stream in line 14 enters the valve box 50 at port 54 and exits the valve box at port 58 for delivery via line 46 to port 22 at the upper end of casing 24. Port 22 thus becomes an inlet port and the air flow is downward through the beds, for discharge at port 20 and delivery via line 16 to the valve box 50 where it enters via port 56 and exits via port 60, into the stack exhaust line 48.

It should be appreciated that the oxidizer 18 shown in the FIGURE, would be substantially equally effective regardless of the air flow direction. It should further be appreciated, however, that in this embodiment most of the oxidation reaction will occur in the second catalyst layer encountered by the air flow. For example, in the operating mode first described above, the air enters inlet port 20 at substantially ambient temperature and with little pressure head. It is preheated as it rises through bed 32, and some oxidation reaction will occur in the catalyst layer 36, especially at the pellet surfaces in contact with the gravel layer 40, i.e., close to the heating coil 42. The air passing through the central gravel region 40 continues to be heated, however, by the coil 42 and thereby reaches maximum temperature substantially as it enters the upper catalyst layer 38, where most of the oxidation occurs. This sequence is, of course, reversed in the alternative mode of operation, where the air flow is downward through the casing.

From the foregoing description, it should be evident to those skilled in this art that a less desirable, but nevertheless operable embodiment of the invention could include only a single catalyst layer such as 38, located immediately downstream of the heating means 42. It should further be appreciated that the catalytic oxidation which occurs at the activation temperature, may result either from the air flow heating the catalyst to the activation temperature, or the catalyst heating the air flow to the activation temperature. Thus, the heating coil 42 or similar means situated in the bed, maintains the catalyst at the desired activation temperature, both directly, and indirectly by the heat supplied to the air flow. In any event, an important advantage of the present invention is that the oxidation catalyst is carried by solid surfaces distributed in the stacked beds so as to be contacted by the air flow through the beds. The solid surfaces in the form of the ceramic pellets, act as heat transfer media similar to the silica gravel. This minimizes the extra energy required to sustain the oxidation reaction.

Thus, the present invention can be implemented in a variety of embodiments including a bed of regenerative heat transfer material to preheat the incoming contaminated air, an oxidation catalyst carried by solid surfaces distributed in or on the heat transfer material, and means for heating the catalyst directly or indirectly, so as to maintain an activation temperature between the catalyst and the air, in the range of about 500-1000 deg.F. Preferably, the heating means are immersed in the bed of regenerative heat transfer material, immediately upstream of a contiguous catalyst layer, so that the air is at its maximum temperature as it enters the catalyst layer. With a catalyst layer substantially as described, i.e., ceramic pellets having a diameter of 5-10mm and coated with a precious metal catalyst to form a layer having a thickness of about 3-6 inches, satisfactory oxidation of typical process by-product can be achieved with a space velocity of approximately 30,000 hr$^{-1}$ through the casing 24.

We claim:

1. A thermal oxidizer for destroying volatile organic compounds in an air stream, comprising:
    a bed including a layer of heat transfer material and a contiguous layer of pellets, each pellet carrying a surface of oxidation catalyst material;
    means situated in the layer of heat transfer material, for heating the bed;
    means for passing an air stream through the heated bed to oxidize the volatile organic compounds as the air stream flows through the bed from the heated layer of the heat transfer material to the layer of said pellets;
    wherein the means for heating maintains the catalyst material surfaces at an activation temperature of between about 500-1000 degrees F.

2. The thermal oxidizer of claim 1, wherein the pellets have a diameter between about 5-10 nm.

3. The thermal oxidizer of claim 1, wherein the heat transfer material of the bed includes a region of silica gravel and the contiguous layer of said pellets having a thickness of at least about 3 inches.

4. A catalytic regenerative thermal oxidizer for destroying volatile organic compounds in a contaminated air stream, comprising:
 a closed reaction vessel having spaced apart inlet and outlet ports for receiving contaminated air and discharging cleaned air, respectively;
 a first heat exchange bed within the vessel and adjacent to the inlet port for receiving air flow from the inlet port;
 a second heat exchange bed within the vessel and adjacent to the outlet port for receiving air flow from the first bed and discharging air flow through the outlet port;
 a first catalyst layer in contact with the first bed and a second catalyst layer in contact with the second bed, each catalyst layer defined by a bed of pellets serving as substrate material which carries oxidizing catalyst material;
 means situated between the first and second catalyst layers for heating the catalyst layers to a temperature between about 500–1000 deg.F.;
 whereby the contaminated air stream is cleaned by oxidation of volatile organic compounds as it flows from the first bed, through the first and second catalyst layers, to the second bed before discharge through the outlet port.

5. The oxidizer of claim 4, wherein each catalyst layer comprises a bed of ceramic pellets as substrates which carry a precious metal catalyst.

6. The oxidizer of claim 4, wherein
 a third heat exchange bed is stacked between and in contact with the first and second catalyst layers, and
 the means for heating generates heat in the third heat exchange bed.

7. The oxidizer of claim 4, wherein the pellets have a diameter of between about 5–10 mm.

8. The oxidizer of claim 6, wherein the first, second, and third heat exchange beds consist essentially of silica gravel and each catalyst layer has a thickness of at least about 3 inches.

9. The oxidizer of claim 6, wherein each catalyst layer consists essentially of a bed of ceramic pellets as substrates which carry a precious metal catalyst.

10. The oxidizer of claim 9, wherein the pellets have a diameter of between about 5–10 mm.

11. The oxidizer of claim 10, wherein the means for heating includes electric heating coils.

12. A catalytic regenerative oxidizer comprising:
 a closed casing having upper and lower ends;
 a lower bed of silica gravel supported in the lower end of the casing;
 a lower catalyst layer resting on the lower bed, and consisting essentially of ceramic pellets which carry an oxidation catalyst material having an activation temperature between about 500–1000 deg.F;
 a central bed of silica gravel resting on the lower catalyst layer;
 an upper catalyst layer resting on the central bed and consisting essentially of ceramic pellets which carry an oxidation catalyst material having an activation temperature between about 500–1000 deg.F;
 an upper bed of silica gravel resting on the upper catalyst layer;
 heating means situated in the central bed; and
 means for establishing a flow of contaminated air into and out of the casing, through the beds and catalyst layers, whereby the contaminant in the flow is oxidized in at least one of the catalyst layers.

* * * * *

UNITED STATES PATENT AND TRADEMARK OFFICE
CERTIFICATE OF CORRECTION

PATENT NO. : 5,262,131
DATED      : November 16, 1993
INVENTOR(S): Craig E. Bayer et al It is certified that error appears in the above-indentified patent and that said Letters Patent is hereby corrected as shown below:

Column 4, last line, "nm" should be --mm--.

Signed and Sealed this

Third Day of December, 1996

Attest:

BRUCE LEHMAN

Attesting Officer

Commissioner of Patents and Trademarks